(12) United States Patent
Impas et al.

(10) Patent No.: US 9,779,545 B1
(45) Date of Patent: Oct. 3, 2017

(54) FOOTPRINT BASED BUSINESS LABEL PLACEMENT

(71) Applicant: MICROSOFT TECHNOLOGY LICENSING, LLC, Redmond, WA (US)

(72) Inventors: Rom Impas, Redmond, WA (US); Jerome Francois Berclaz, Redmond, WA (US); Timo Pekka Pylvaenaeinen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/199,429

(22) Filed: Jun. 30, 2016

(51) Int. Cl.
G09G 5/00 (2006.01)
G06T 17/05 (2011.01)
G06T 3/40 (2006.01)
G06T 3/60 (2006.01)

(52) U.S. Cl.
CPC ............. G06T 17/05 (2013.01); G06T 3/40 (2013.01); G06T 3/60 (2013.01)

(58) Field of Classification Search
None
See application file for complete search history.

(56) References Cited

U.S. PATENT DOCUMENTS

| | | | |
|---|---|---|---|
| 5,684,940 A * | 11/1997 | Freeman | G06T 11/206 345/630 |
| 7,557,736 B1 | 7/2009 | Daily et al. | |
| 8,464,181 B1 | 6/2013 | Bailiang et al. | |
| 8,988,426 B2 | 3/2015 | Chen et al. | |
| 2010/0085350 A1 | 4/2010 | Mishra et al. | |
| 2012/0129559 A1 * | 5/2012 | Pochop, Jr. | H04W 16/18 455/507 |
| 2012/0245848 A1 | 9/2012 | Spindler et al. | |
| 2013/0321397 A1 * | 12/2013 | Chen | G06T 17/05 345/419 |
| 2013/0322702 A1 | 12/2013 | Piemonte et al. | |
| 2014/0113665 A1 * | 4/2014 | Li | G01C 21/206 455/457 |
| 2014/0119654 A1 | 5/2014 | Taylor et al. | |
| 2014/0223360 A1 | 8/2014 | Bailiang | |
| 2014/0365114 A1 | 12/2014 | van Os et al. | |

(Continued)

OTHER PUBLICATIONS

Kakoulis et al., "On the complexity of the Edge Label Placement problem", Computational Geometry 18 (2001) 1-17.*

(Continued)

*Primary Examiner* — Zhengxi Liu
*Assistant Examiner* — Khoa Vu
(74) *Attorney, Agent, or Firm* — Shook, Hardy & Bacon L.L.P.

(57) ABSTRACT

Aspects of the technology described herein optimally locate business labels within the footprint of a building shown on a digital map. An optimal arrangement comprises business labels displayed entirely within the building footprint without the business labels overlapping each other. The technology initially generates label arrangements and calculates a cost for the arrangements. A cost of zero means the arrangement is optimal. For non-zero costs, a lower cost means the arrangement is close to an optimal arrangement. The technology can continue to generate arrangements for analysis until an acceptable arrangement is found.

18 Claims, 13 Drawing Sheets

(56) References Cited

U.S. PATENT DOCUMENTS

| | | | |
|---|---|---|---|
| 2015/0003741 A1 | 1/2015 | Zhang et al. | |
| 2016/0063722 A1* | 3/2016 | Allred | G06T 11/203 345/665 |
| 2016/0282126 A1* | 9/2016 | Watts | G01C 21/206 |
| 2016/0371394 A1* | 12/2016 | Shahidi | G06F 17/30958 |

OTHER PUBLICATIONS

Wang, Evan. "A D3 plug-in for automatic label placement using simulated annealing." (2013).*

Kakoulis, Konstantinos G. and Ioannis G. Tollis. "Labeling Algorithms." Handbook of Graph Drawing and Visualization (2013).*

Marks, Joe, and Stuart Merrill Shieber. "The computational complexity of cartographic label placement." (1991).*

Grabler, et al., "Automatic Generation of Tourist Maps", In Journal of ACM Transactions on Graphics, vol. 27, Issue 3, Aug. 2008, 11 pages.

Mnih, Volodymyr, "Machine Learning for Aerial Image Labeling", In PhD Thesis, Sep. 18, 2013, 109 pages.

Süveg, Ildikó, "Reconstruction of 3D Building Models from Aerial Images and Maps", In ISPRS Journal of Photogrammetry and Remote Sensing, vol. 58, Issue 3-4, Jan. 2004, 156 pages.

* cited by examiner

FOOTPRINT BASED BUSINESS LABEL PLACEMENT

BACKGROUND

Automatically generated maps, such as those used for navigation systems and online search, rely on address geocoding to find a point location for businesses. The geocode is often in the street near the business or in the middle of the building. Today's automated system simply places a label for the business tethered to the geocode regardless of where the geocode is located relative to other features on the map. The labels typically are oriented left to right in a horizontal configuration suitable for reading.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein optimally locate business labels within the footprint of a building shown on a digital map. As used herein, an optimal arrangement comprises business labels displayed entirely within the building footprint without the business labels overlapping each other. Optimizing label arrangements can be a particular difficulty task when multiple small stores are located within the same building. For example, a shopping center can be a single building with multiple businesses. Similarly, downtown areas often include buildings with multiple businesses located closely together.

The technology initially generates an arrangement of labels and calculates a cost for the arrangement. A cost of zero means the arrangement is optimal. For non-zero costs, a lower cost means the arrangement is close to an optimal arrangement. For an initial arrangement, the labels can be anchored to the exterior perimeter of the footprint at a location associated with an entrance to the building. The initial arrangement can place the labels perpendicular to the exterior perimeter. Subsequent arrangements can be generated by rotating the labels different degrees from perpendicular. In an aspect, each label is rotated the same degree, such as 5°, 10°, 12.5°, 15°, 30°, 45°, or such.

The cost for each arrangement is calculated by determining an area of one or more labels that fall outside of the business footprint. In addition, any portion of the labels that overlap with each other form part of a cost. In aspects, scenario related penalties can be added to the cost. For example, a penalty can be added to the cost for each business label that is omitted. Once a cost is zero, that means that all of the labels fit within the business footprint and do not overlap each other. More than one possible arrangement can have zero cost. Aspects of the technology can use the first arrangement discovered with zero cost. If the first arrangement has a cost of zero, then no further arrangement needs to be tested.

If the cost is greater than zero and/or does not meet another selection criteria, then a second arrangement of labels is generated and evaluated. The cost is then calculated for the second arrangement. If the cost is lower for the second arrangement than the first arrangement, then the first arrangement is eliminated and the second arrangement replaces it as the presumptive arrangement. If the cost for the second arrangement is not zero, then additional arrangements can be generated until an arrangement with a cost of zero is found or the lowest cost arrangement is identified. Each arrangement is generated by rotating the labels a different amount. In an aspect, the rotation amount is selected randomly. The rotation amount can be constrained to variations of 1°, 2°, 5°, 10°, 12.5°, and such. In another aspect, the rotation can be systematic. For example, each arrangement could be generated by rotating the labels an additional 12.5° in a clockwise direction.

If a zero cost arrangement is not found after a threshold amount of arrangements are tested, then secondary changes can be made and a new set of arrangements generated and analyzed. Some of the secondary changes, such as excluding one or more labels, can incur a penalty as part of the cost calculation.

BRIEF DESCRIPTION OF THE DRAWINGS

Aspects of the technology described in the present application are described in detail below with reference to the attached drawing figures, wherein.

DETAILED DESCRIPTION

Figure 1:
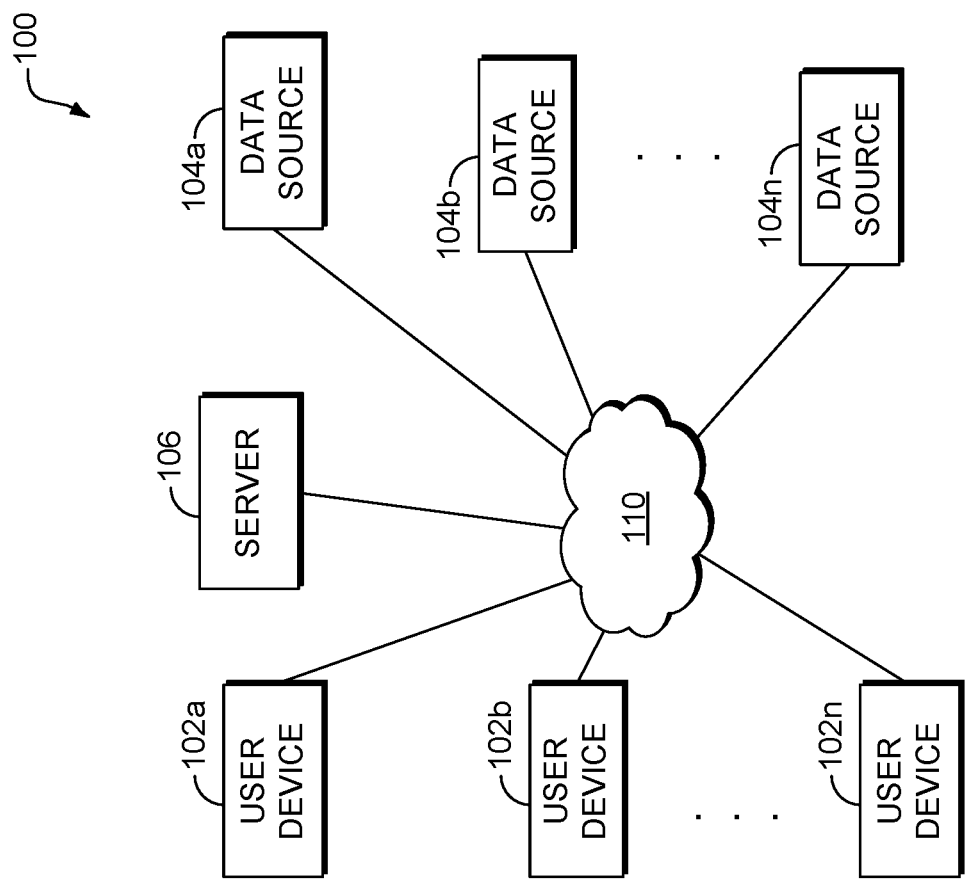
FIG. 1 is a block diagram of an exemplary computing environment suitable for implementing aspects of the technology described herein.

The technology of the present application is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein optimally locate business labels within the footprint of a building shown on a digital map. As used herein, an optimal arrangement comprises business labels displayed entirely within the building footprint without the business labels overlapping each other. Optimizing label arrangements can be a particular difficulty task when multiple small stores are located within the same building. For example, a shopping center can be a single building with multiple businesses. Similarly, downtown areas often include buildings with multiple businesses located closely together.

The technology initially generates an arrangement of labels and calculates a cost for the arrangement. A cost of zero means the arrangement is optimal. For non-zero costs, a lower cost means the arrangement is close to an optimal arrangement. For an initial arrangement, the labels can be anchored to the exterior perimeter of the footprint at a location associated with an entrance to the building. The initial arrangement can place the labels perpendicular to the exterior perimeter. Subsequent arrangements can be generated by rotating the labels different degrees from perpendicular. In an aspect, each label is rotated the same degree, such as 5°, 10°, 12.5°, 15°, 30°, 45°, or such.

The cost for each arrangement is calculated by determining an area of one or more labels that fall outside of the business footprint. In addition, any portion of the labels that overlap with each other form part of a cost. A cost of zero means that all of the labels fit within the business footprint and do not overlap each other. More than one possible arrangement can have zero cost. Aspects of the technology can use the first arrangement discovered with zero cost. If the first arrangement has a cost of zero, then no further arrangement needs to be tested.

If the cost is greater than zero, then a second arrangement of labels is generated. The second arrangement can be generated by rotating the labels about an anchor on the exterior of the footprint near where an entrance to the business is located. The cost is then calculated for the second arrangement. If the cost is lower for the second arrangement than the first arrangement, then the first arrangement is eliminated and the second arrangement replaces it as the presumptive arrangement. If the cost for the second arrangement is not zero, then additional arrangements can be generated until an arrangement with a cost of zero is found or the lowest cost arrangement is identified. Each arrangement is generated by rotating the labels a different amount. In an aspect, the rotation amount is selected randomly. The rotation amount can be constrained to variations of 1°, 2°, 5°, 10°, 12.5°, and such. In another aspect, the rotation can be systematic. For example, each arrangement could be generated by rotating the labels an additional 12.5° in a clockwise direction.

If a zero cost arrangement is not found after a threshold amount of arrangements are tested, then secondary changes can be made according to a second scenario and a new set of arrangements generated and analyzed. In one aspect, the anchor points are equally distributed along the edge of the business footprint rather than being tied to the business entrance. Using this arrangement, the previously described process is repeated with different arrangements being generated and analyzed to determine an arrangement with either zero cost or the lowest cost. If the lowest cost arrangement is lower than the cost associated with the lowest cost arrangement with the labels anchored to the entrance, then the evenly spaced arrangement could replace the fixed storefront arrangement within the system.

In an aspect, if the evenly spaced arrangement does not produce an arrangement with zero cost, then one of the labels can be removed and the process repeated to determine if an arrangement with zero cost can be identified. Different methods can be used to determine the label that is excluded. In one aspect, a label that contributes the highest cost to one or more different arrangements is removed. In another aspect, a label that contributes the most cost across all arrangements previously calculated is removed. In another aspect, contextual factors are used to determine which label to remove. Contextual factors can include business popularity. For example, more users are likely to want the location of a restaurant or coffee shop on a map than a law office.

In another aspect, different versions of the same map can be generated for presentation at different times of the day. For example, a business that closes at 5 o'clock could be excluded for maps to be shown after 5 o'clock. A business that is closed in the morning, such as a restaurant or movie theater, could be excluded from maps that are shown in the morning.

In another aspect, different versions of the same map can be generated for presentation to users with different user profiles. For example, women may not be shown a map that includes a barbershop catering to men. Known vegetarians may be shown a map that does not include steakhouses.

In one aspect, a visibility penalty is added to the cost calculation when less than all available labels are shown. The visibility penalty can be calculated by multiplying the amount of excluded labels by a visibility factor. The visibility factor can be set editorially at a point where the developer would prefer the labels to either overlap or fall outside the footprint instead of excluding a label. In other words, visibility factor could be equal to the combined overlap or spill over that is acceptable to the developer.

Label placements can be calculated at different zoom levels. The lower the zoom, the less likely an optimal arrangement can be found, especially if the label font size does not change as the zoom changes or the label has a minimum font size.

Having briefly described an overview of aspects of the technology described herein, an exemplary operating environment suitable for use in implementing the technology is described below.

Exemplary Operating Environment

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; map server 106; and network 110. It should be understood that environment 100 shown in FIG. 1 is an example of one suitable operating environment. Each of the components shown in FIG. 1 may be implemented via any type of computing device, such as computing device 1300 described in connection to FIG. 13, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be client devices on the client-side of operating environment 100, while map server 106 can be on the server-side of operating environment 100. In one aspect, maps generated by the technology described herein can be accessed through the user devices. In addition, the user devices can communicate contextual information and user profile information to the map server 106. The information provided can be used by the map server 106 to populate map labels or other information on a map that the user is likely to be interested in.

Server 106 can comprise server-side software designed to work in conjunction with client-side software on user devices 102a and 102b through 102n so as to implement any combination of the features and functionalities discussed in the present disclosure. For example, the server 106 can communicate with a web browser or other application on the devices 102a and 102b through 102n to receive map requests and output map data for display to the user. This division of operating environment 100 is provided to illustrate one example of a suitable environment. There is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 13 herein. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

Data sources 104a and 104b through 104n may comprise data sources and/or data systems, which provide content to constituents of operating environment 100, or system 200 described in connection to FIG. 2. (For example, in one aspect, one or more data sources 104a through 104n provide (or make available for accessing) map content.) Data sources 104a and 104b through 104n may be discrete from user devices 102a and 102b through 102n and map server 106 or may be incorporated and/or integrated into at least one of those components. The data sources can comprise a knowledge base that stores information about businesses. For example, the data sources 104a though 104n can include geocode information for businesses and business association with a building that can be mapped to a footprint on the map. The data sources can include information about where a business entrance is located. The location information can be absolute in the form of map coordinates or relative to a landmark, such as the corner of a building. The data sources can include information about business hours, classifications by products and services offered, and other data. The data sources can include business labels. The labels can be full labels or truncated in some fashion. Truncated labels include less than the full name of a business.

Figure 2:
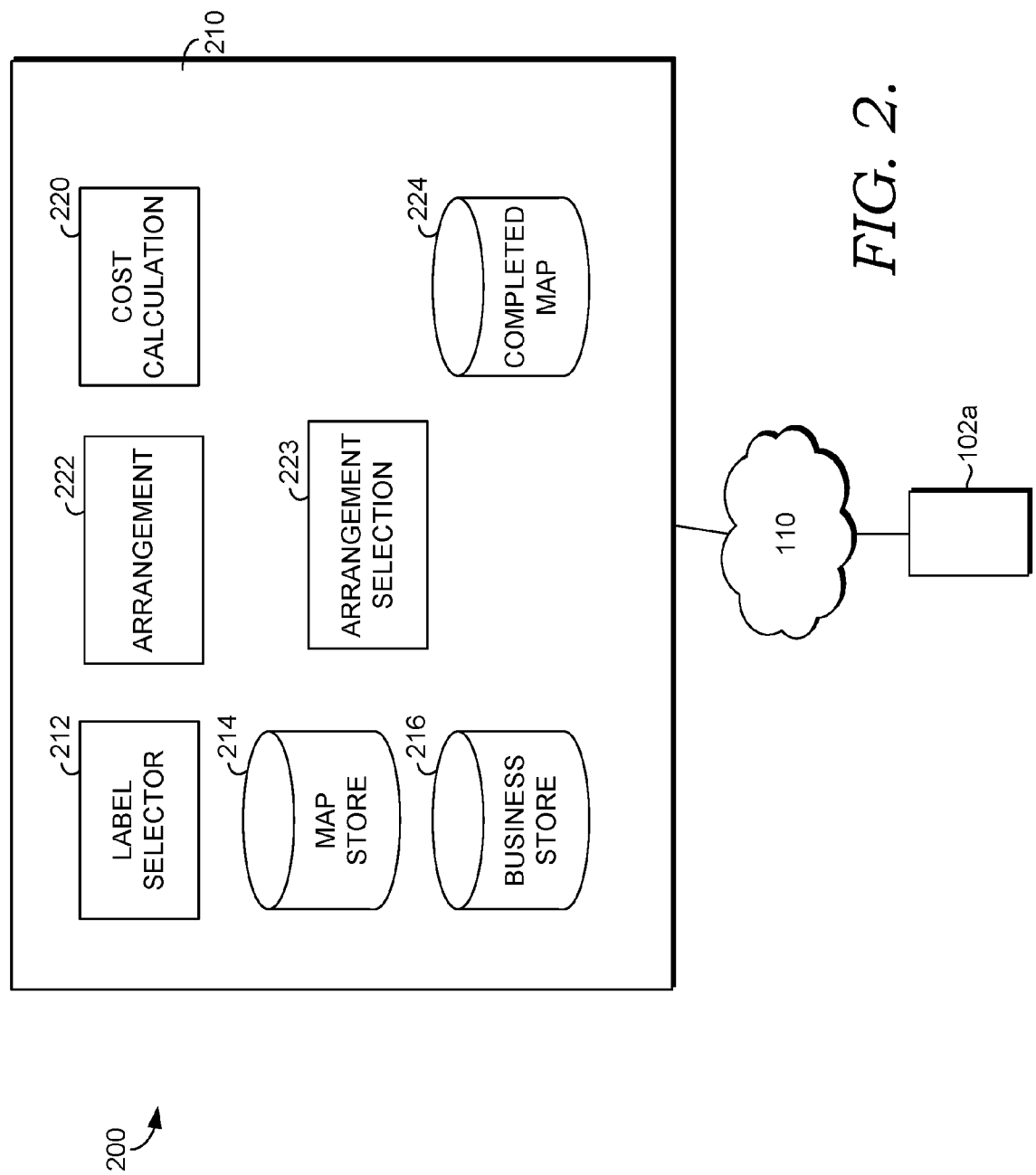
FIG. 2 is a diagram depicting an exemplary computing environment for adding business labels to a map, in accordance with an aspect of the technology described herein.

Operating environment 100 can be utilized to implement one or more of the components of system 200, described in FIG. 2, including components for collecting user data, monitoring reading and writing events, generating annotations, and identifying unknown words.

Turning now to FIG. 2, a map generator 210 comprises a label selector 212, a map data store 214, a business information data store 216, a label arrangement component 222, a cost calculation component 220, and a completed map data store 224. When requested, a completed map can be retrieved from the completed map data store 224 and communicated over network 110 to the client device 102A. The retrieval and transmission process may be completed by components that are not shown in FIG. 2.

The label selector 212 selects or generates labels that are to be added to a map. The labels can include the names of businesses. As used herein, a business can be any entity with a physical location. For example, a business could be a church, community center, government office, library, restaurant, store, landmark, or law office. The business label can include the name of a business, a logo, or some other icon that describes the business. For example, restaurant labels could include a fork and knife icon. The businesses may have location information associated with them in the business information store 216. The location information can include a geocode for the business. The geocode can be a rough approximation of where the business is located. For example, a geocode associated with a business could be located in the middle of a street adjacent to where the business is located. Alternatively, the geocode could be in the middle of a building where the business is located, along with other businesses. For example, business within a strip shopping center could all be associated with the same geocode.

The location information can also include store or business entrance data. The entrance data identifies an approximate location of the entrance to a business along an exterior of the business. For example, street side visual data which is tagged with business entrance data can be used to determine the entrance of a business on a footprint. The tags can be compared to other reference points on the building, such as a corner of the building or distance from each other when multiple businesses are located in the same building.

The label selector 212 generates a label for inclusion in the map. The label text can be selected from a business data store. The label can be generated according to style guides for the map. The style guide can specify font, font size, font color, and other characteristics. The text can be the full business name or a shortened version of the business name.

The business information store 216 can also include information about what products or services a business offers, hours of operation, and other data used to classify a business into one or more subject matter categories. For example, a business could be classified as a restaurant, a movie theater, a clothing store, an electronic store, and such.

The map data store 214 includes maps of various geographic locations. The maps can be composed from multiple graphical objects and can depict buildings, building footprints, streets, and other geographic features. The maps can be images, such as those taken through aerial photography, or animated, such as those commonly found in navigation systems displayed on a computer or other client device. The maps can include footprints for one or more buildings. The footprint can be derived from aerial photography or some other source. The footprint is comprised of lines that conform to the exterior perimeter of the buildings. The footprints can form regular or irregular shapes. The footprint can exclude small protrusions from a building. Accordingly, the footprint for a building is approximately the same shape as the actual building and sized according to the scale of the map to match the size of the actual building.

The arrangement component 222 generates different label arrangements within a building footprint. Each arrangement is then analyzed for a cost by the cost calculation component 220. As mentioned, the cost is based on the area of labels that fall outside of the footprint and the area of overlap between labels. The arrangement component 222 can continue to generate arrangements until the cost for an arrangement is zero or all arrangements have been attempted or a threshold number of arrangements have been attempted.

The cost calculation component 220 can use the following formula to calculate cost: total cost=overlap area of labels+ total area of labels that are outside the building footprint+ (number of hidden labels*VISIBILITY_FACTOR). As mentioned, when an arrangement showing all labels and having zero cost cannot be found, then one or more labels could be removed. These arrangements can be scored with a visibility penalty, which is the number of hidden labels multiplied by the visibility factor. The visibility factor can be set editorially at a value where the developer would prefer the labels to either overlap or fall outside the footprint instead of excluding a label. In other words, the visibility factor could be equal to the combined overlap of labels and the label area outside the footprint that is worth not showing a label. If any label overlap or protrusion beyond the footprint is unacceptable, then the visibility factor would be zero or a small number to eliminate or minimize a visibility penalty for not showing labels. The cost could be expressed in pixels or some other unit of measure for screen area.

In addition to the above cost formula, an additional formula could be: total cost=overlap area of labels+total area of labels that are outside the building footprint+(number of hidden labels*VISIBILITY_FACTOR)+(number of labels not anchored to a business-entrance anchor*non-anchored Factor). This anchor penalty (number of labels not anchored to a business-entrance anchor*non-anchored Factor) can be used to give preferential treatment to arrangements that anchor the labels to the business entrance. Other scenario based penalties could be added to the cost calculation. In one aspect, the anchor penalty could only be applied at certain zoom levels. In one instance, the anchor penalty is only applied for the highest zoom level.

In one aspect, a cost factor could be included in the formula for labels that are not perpendicular to the wall to which the label is anchored.

The arrangement selection component 223 selects the arrangement to be shown on the final map, which is stored in completed map data store 224. The arrangement selection component 223 can evaluate the cost for the first arrangement and then provide instructions whether a second arrangement should be generated. The arrangement selection component 223 can determine how many different arrangements are evaluated for a given scenario. The scenarios can be defined by the number and arrangement of labels included in the arrangement. For example, a first scenario includes labels for all businesses in a building. A second scenario could have less than all businesses. The criteria for removing a label can also define a scenario. The scenario can also be based on label location. For example, the base scenario can be labels located on an entrance anchor. Additional, scenarios can evenly space the labels or select some other arrangement.

Figure 3:
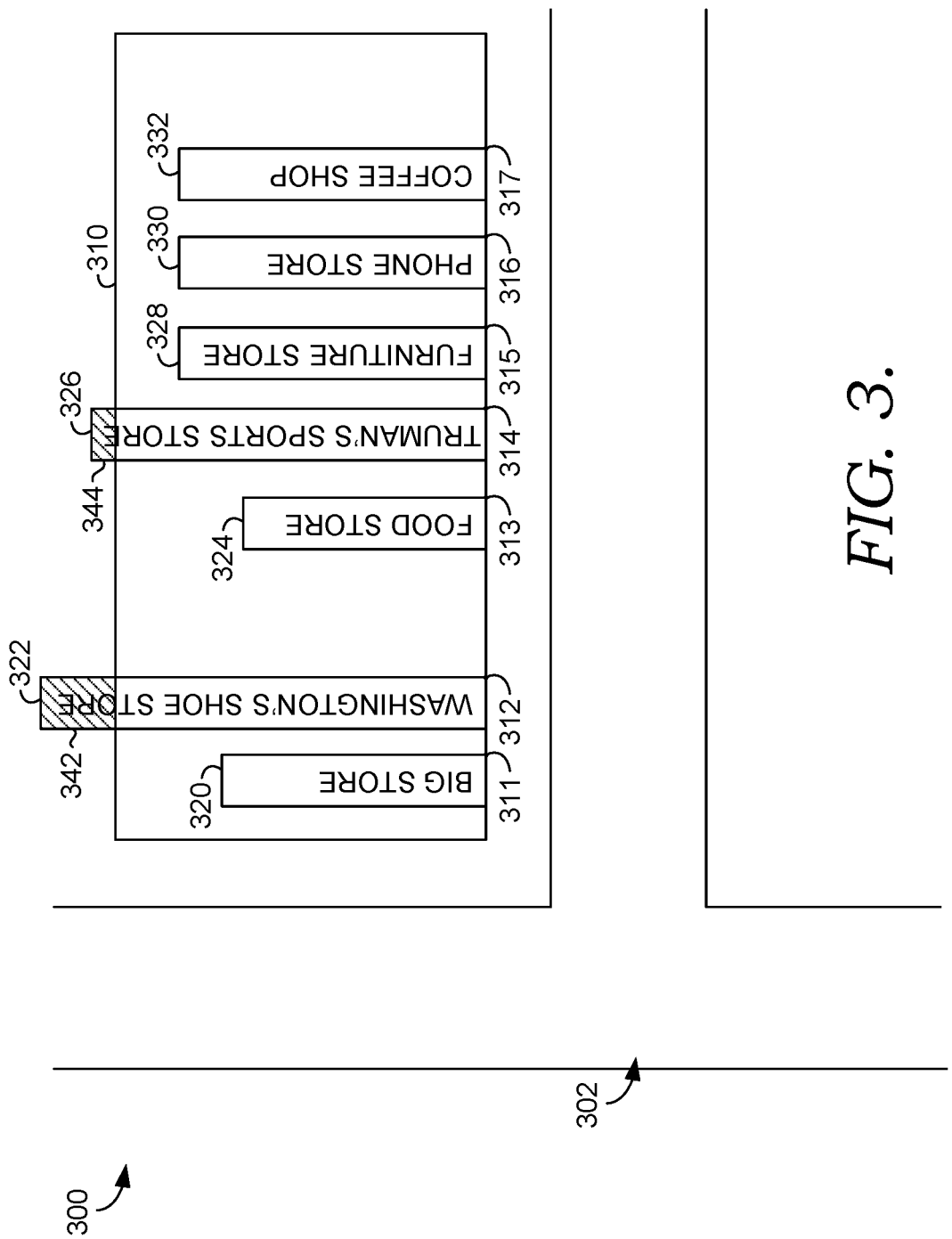
FIG. 3 is a diagram depicting a first label placement arrangement, in accordance with an aspect of the technology described herein.

Turning now to FIG. 3, a preliminary arrangement 300 of labels within a building footprint is shown, according to an aspect of the technology described herein. As can be seen, the building footprint 310 is depicted on a map that includes a road 302. For the sake of simplicity, road names and other details typically shown on a map are excluded. The preliminary arrangement includes seven business labels. Each business label is anchored to a business entrance anchor. The seven labels represent all seven businesses in the building.

The big store label 320 is anchored to a first business-entrance anchor 311. The Washington's shoe store label 322 is anchored to a second business-entrance anchor 312. The food store label 324 is anchored to a third business-entrance anchor 313. The Truman's sports store label 326 is anchored to a fourth business-entrance anchor 314. The furniture store label 328 is anchored to a fifth business-entrance anchor 315. The phone store label 330 is anchored to a sixth business-entrance anchor 316. The coffee shop label 332 is anchored to a seventh business-entrance anchor 317. The location on the footprint for each business-entrance anchor can be calculated or determined as described above through analysis of street side viewing data or other survey data. The business-entrance anchor approximates a location of a business' entrance on a building footprint.

As can be seen, each label is snapped to the lower footprint edge. Each label is perpendicular to the edge. Aspects of the technology are not limited to starting with a preliminary arrangement showing the labels perpendicular to a edge of the building footprint 310. In one aspect, the initial orientation of the labels is randomly generated for the preliminary arrangement. As can be seen, each label has the same font which can be at an established minimum for a given zoom level. In general, the labels can be generated in conformance with guidelines that specify how labels should appear.

As can be seen, two of the labels protrude across the building footprint 310. None of the labels overlap. As mentioned, a cost can be calculated for each arrangement generated. The cost for the preliminary arrangement can be calculated by totaling the area of the labels that protrudes from the footprint. The cost formula can be the area of protrusion, plus the area of overlap, plus a visibility penalty. Other penalties can also be included as described previously. In this case, there is no overlap or hidden labels, so the cost formula is just the protrusion area. The Washington's shoe store label 322 includes protrusion area 342. The Truman's sports store label 326 includes a smaller protrusion area 344. Combining the area of protrusion area 342 and the area of protrusion area 344 determines a cost for the preliminary arrangement. In this example, the seven labels shown represent all seven business located within the building represented by footprint 310. If one or more labels were excluded then an additional cost could be incurred as illustrated subsequently.

Figure 4:
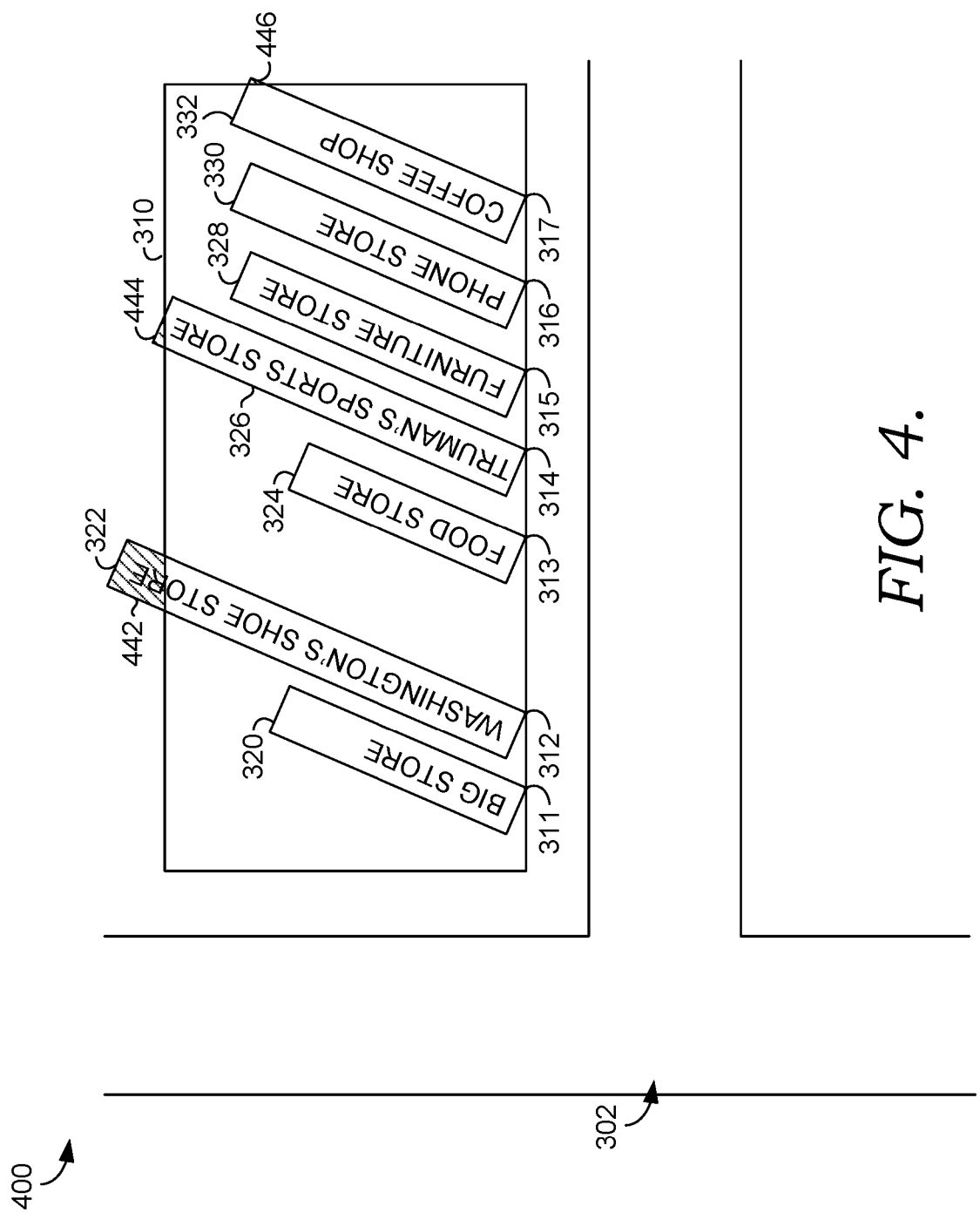
FIG. 4 is a diagram depicting a second label placement arrangement, in accordance with an aspect of the technology described herein.

Turning now to FIG. 4, a second arrangement 400 is shown, according to aspects of the technology described herein. The labels are still in contact with the lower edge and are rotated about a single corner. The corner used for the rotation point can be selected to minimize protrusion across the edge on which the labels are anchored. For example, the right lower corner of the label could be used for a clockwise rotation of up to 180 degrees. Conversely, the lower left corner of the label could be selected for counter-clockwise rotation of up to 180 degrees. As can be seen, each of the previously described labels has been rotated in a clockwise direction. For example, the labels could have been rotated 12.5 degrees in a clockwise direction. The amount of rotation could have been selected at random. In another aspect, the rotation used to generate each subsequent arrangement is predetermined and sequential. For example, subsequent arrangements could each rotate the labels an additional ten degrees until ninety degrees or some other stopping point is reached. In one aspect, an initial group of arrangements are generated at a high level of granularity. For example, the labels could be rotated an additional 10 degrees per iteration to form each new arrangement. The lowest cost arrangement could then be used as a starting point for additional arrangements that vary the orientation change by a lesser amount, such as one degree.

The cost for the second arrangement 400 is calculated by combining the area of protrusion area 442, protrusion area 444, and protrusion area 446. As can be seen, the protrusion areas are smaller than corresponding areas in the preliminary arrangement, especially the protrusion area associated with the Truman's sports store label 326. Accordingly, the combined cost for the second arrangement 400 is less than the cost for the preliminary arrangement 300. Accordingly, the second arrangement 400 can become the presumptive arrangement, pending the costs of subsequently generated arrangements. As mentioned, in one aspect arrangements are generated and evaluated until an arrangement with zero cost is identified. Absent an arrangement with zero cost, the lowest cost arrangement can be selected.

Figure 5:
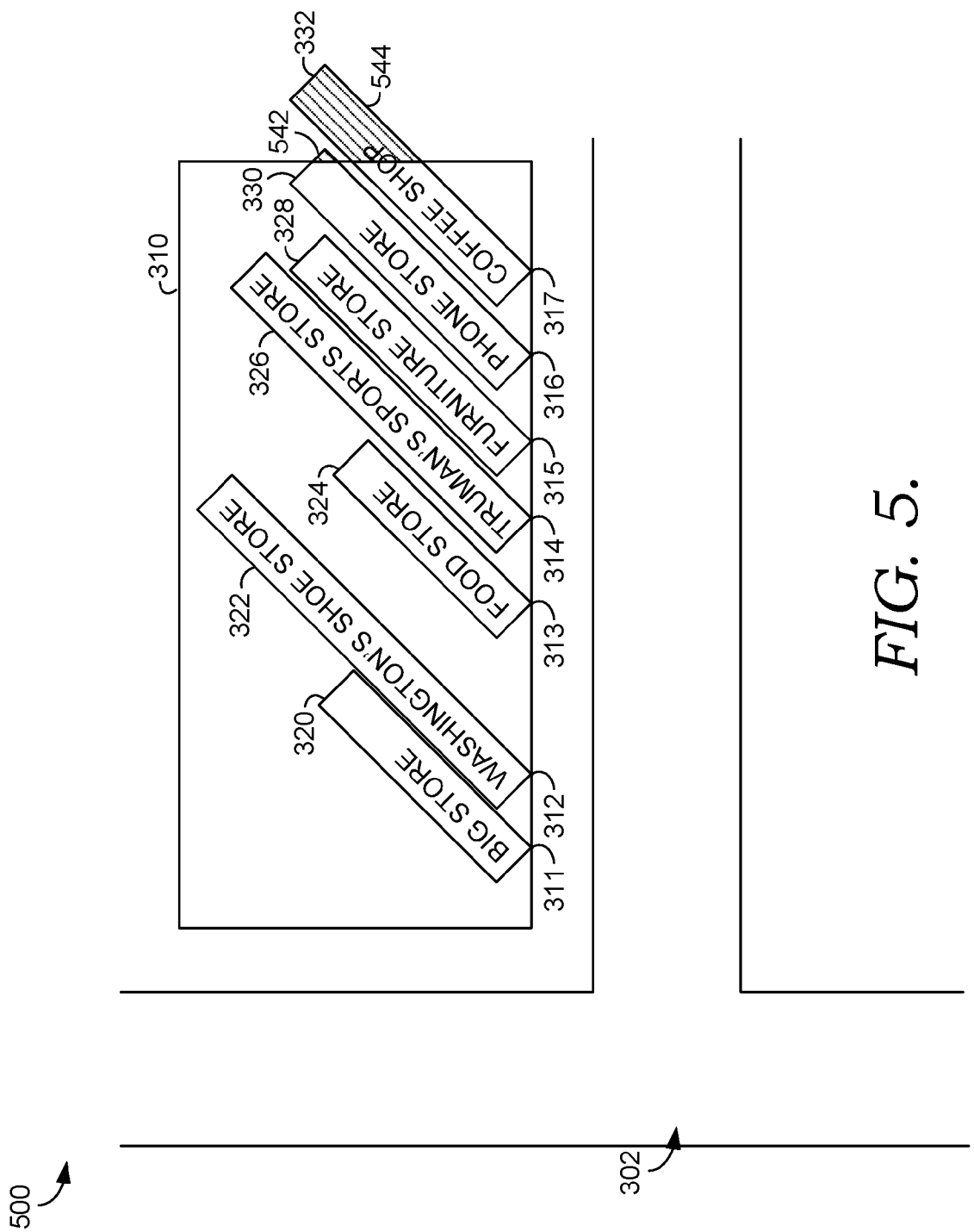
FIG. 5 is a diagram depicting a third label placement arrangement, in accordance with an aspect of the technology described herein.

Turning now to FIG. 5, a third arrangement showing all seven available labels is shown. In contrast to the previous arrangement, the Washington's shoe store label 322 and the Truman's sports store label 326 no longer protrude from the building footprint 310. The cost for the third arrangement 500 can be determined by combining the areas of protrusion area 542 and protrusion area 544. As can be seen, the protrusion area 542 is formed by the protrusion of the phone store label 330 protruding past the exterior of the footprint 310. Similarly, the protrusion area 544 is formed by the protrusion of the coffee shop label 332 from the footprint. The cost associated with the third arrangement 500 can be compared with the cost of the second arrangement 400, which had the lowest cost calculated so far to determine which arrangement is better. In this example, the second arrangement had 400 a lower cost and the third arrangement 500 can be excluded from consideration.

Figure 6:
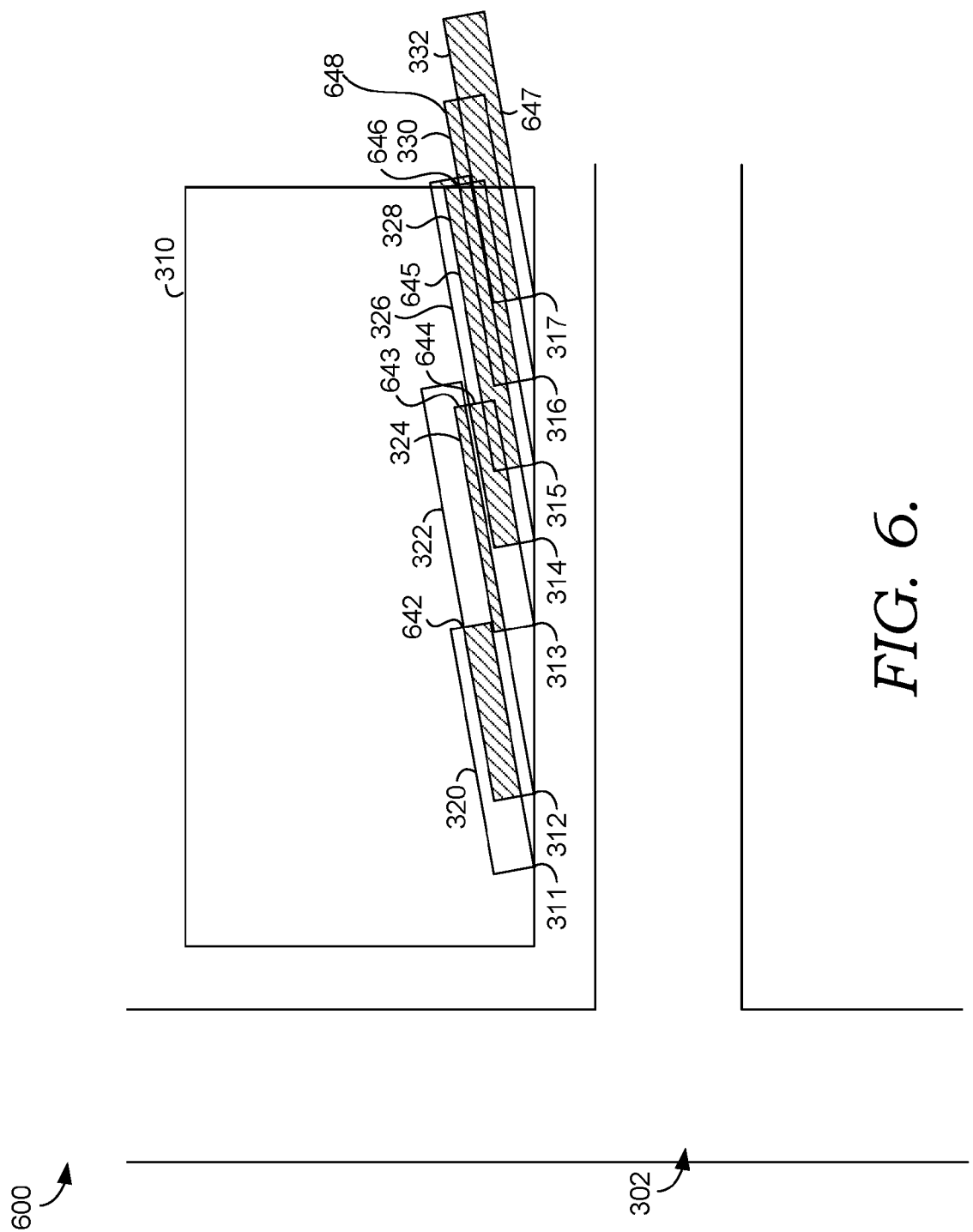
FIG. 6 is a diagram depicting a fourth label placement arrangement, in accordance with an aspect of the technology described herein.

Turning now to FIG. 6, a fourth arrangement 600 having a further orientation change to the business labels is show, in accordance with an aspect of the technology described herein. The fourth arrangement 600 shows the labels approaching parallel to the line on which they're anchored. The fourth arrangement 600 includes both protrusion areas and overlap zones. The first overlap zone 642 is created by the overlap of labels 320 and 322. The second overlap zone 643 is created by the overlap of the label 322 and the label 324. The third overlap zone 644 is created by the overlap of labels 324 and 326. The fourth overlap zone 645 is created by the overlap of the label 326 and the label 328. The fifth overlap zone 646 is created by the overlap of the label 328 and the label 330.

When a label both overlaps and protrudes, the zone can be counted as a protrusion only. In another aspect, the zones are double counted by including overlap area outside of the footprint in the cost calculation. The first protrusion zone 647 is caused by the protrusion of the label 332. The second protrusion zone 648 is created by the protrusion of the label 330.

The cost for the fourth arrangement 600 is calculated by combining the overlap zones with the protrusion areas. In this case, the cost of the fourth arrangement at 600 far exceeds the cost associated with previous arrangements. Accordingly, the fourth arrangement 600 can be eliminate from consideration.

Figure 7:
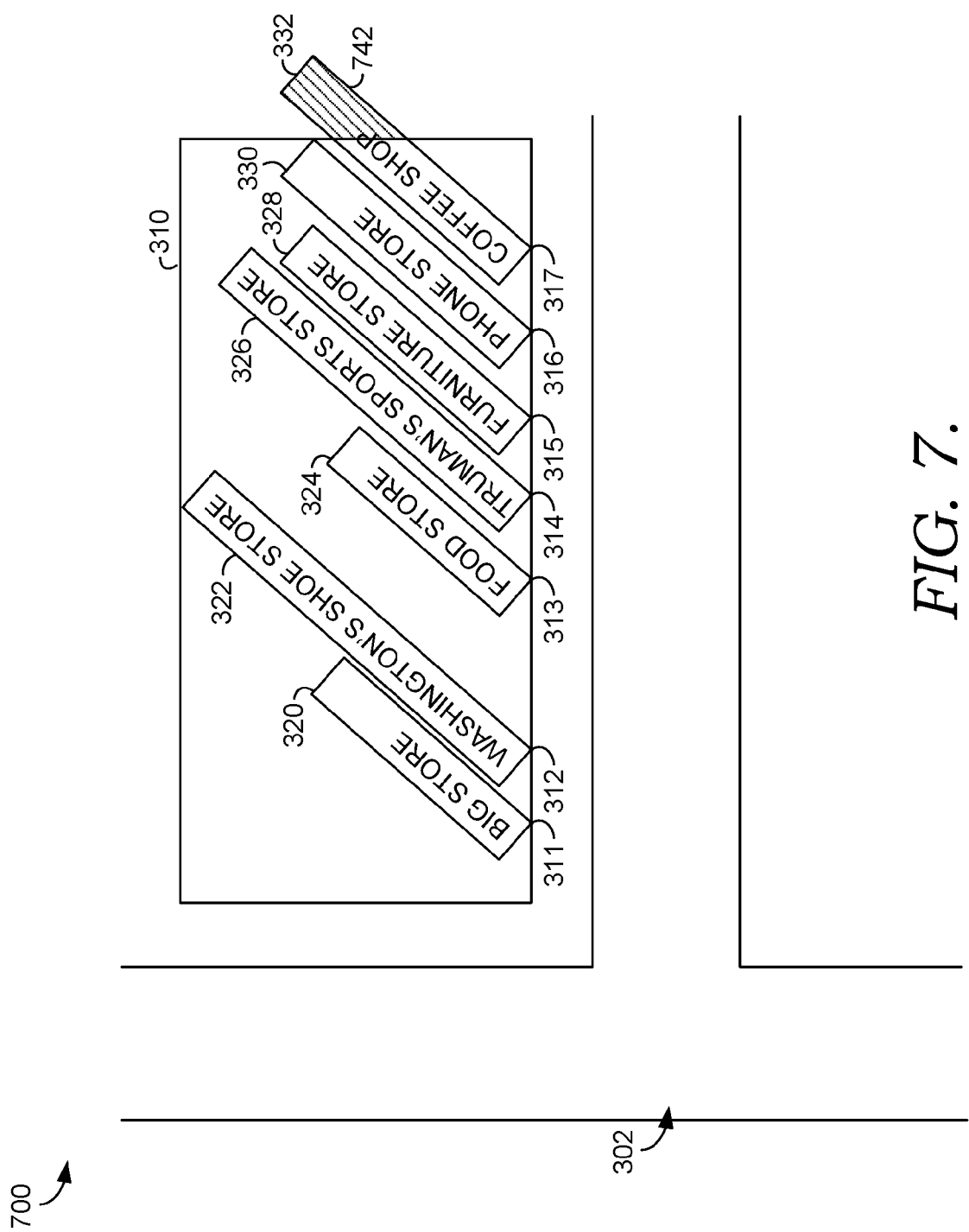
FIG. 7 is a diagram depicting a fifth label placement arrangement, in accordance with an aspect of the technology described herein.

Turning now to FIG. 7, a fifth arrangement 700 is illustrated, in accordance with an aspect of the technology described herein. The fifth arrangement 700 shows an orientation close to 45 degrees from the edge. The fifth arrangement 700 only includes a single protrusion zone 742 formed by the protrusion of the coffee shop label 332 from the footprint 310. In this example, the cost is still higher than the cost for the second arrangement, thus the fifth arrangement need not be considered for display. At some point, all iterations of arrangements that can be built according to the constraints used to rotate the labels are built and evaluated. For example, 36 arrangements could be built if each orientation needs to be 10 degrees from each other. The lowest cost arrangement could be selected or a subsequent set of scenarios could be evaluated to determine whether a zero cost arrangement can be found. The alternate scenarios include evenly spacing the business labels, rather than anchoring them to the business entrances. Additional scenarios include excluding one or more labels. In one aspect, the lowest cost arrangement from the original scenario is selected if the cost is less than a threshold.

Figure 8:
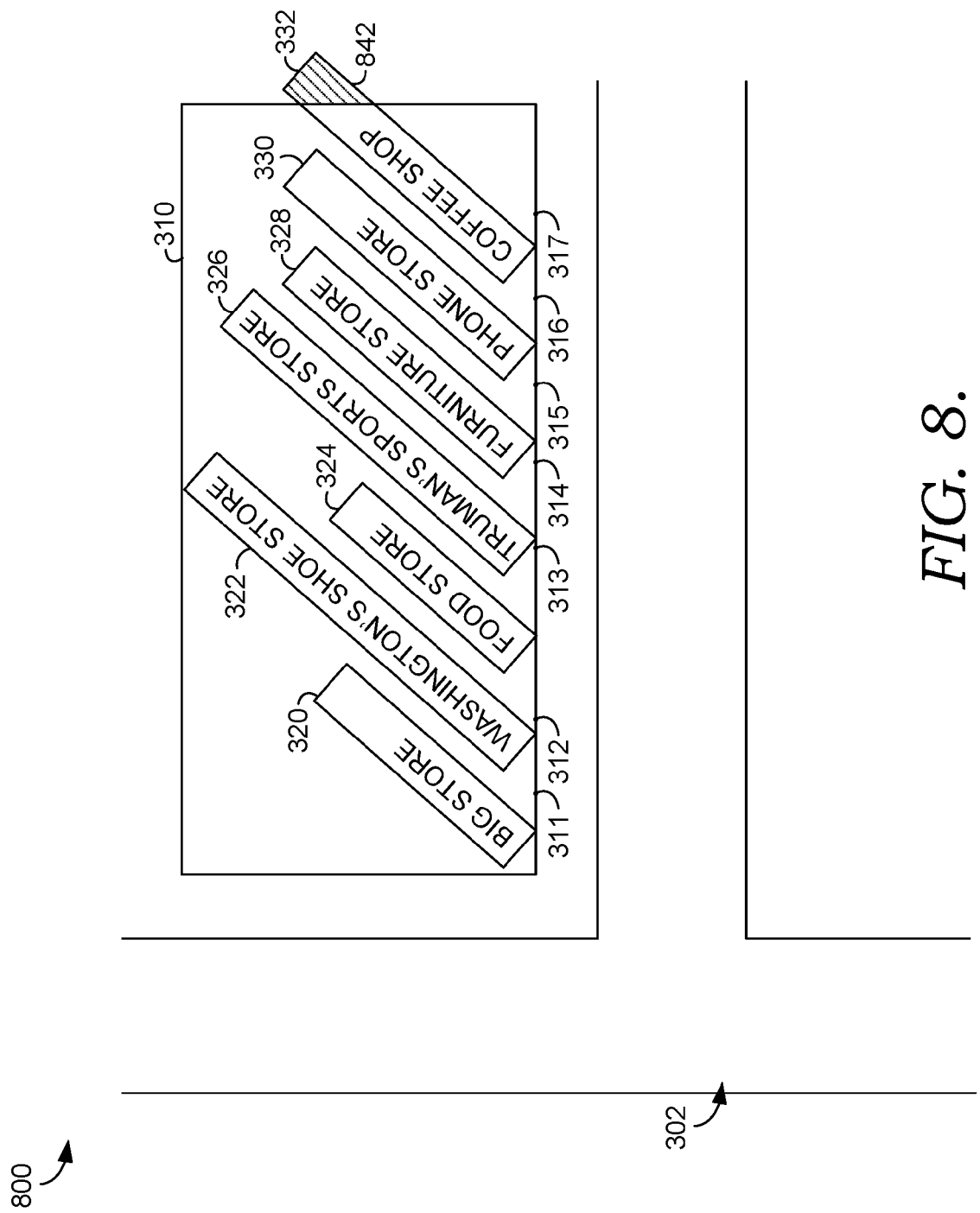
FIG. 8 is a diagram depicting a sixth label placement arrangement, in accordance with an aspect of the technology described herein.

Turning now to FIG. 8, an sixth arrangement 800 of the labels is shown. The evenly spaced arrangement is built using a different scenario having a different set of location constraints. As can be seen, the labels are no longer anchored to the business-entrance anchors. In one aspect, the preliminary arrangement under the new scenario is generated using the orientation of labels that produce the lowest cost when the labels were anchored to the business entrances. In this case, the cost can be calculated by determining the area of protrusion area 842. Protrusion area 842 is generated when the coffee shop label 332 protrudes from the building footprint 310. The cost for this arrangement is less than the cost for the fifth arrangement 700 but greater than the cost for the second arrangement. The cost could also include a scenario penalty. For example, a penalty could be imposed for each label that is not anchored within a threshold from the business-entrance anchor. Alternatively, the penalty could be based on the combined distance each label is from its corresponding business anchor.

In another aspect, the initial arrangement is selected based on a likely benefit to be achieved by evenly spacing the labels. For example, evenly spacing the labels, as shown in the sixth arrangement 800 is likely to decrease the protrusion zone from the coffee shop label 332, but is unlikely to help any protrusions from the top of the footprint relative to the protrusion created by the same labels at the same rotation. Accordingly, an arrangement with minimal protrusions across the top could be selected as an initial or preliminary arrangement under the evenly spaced scenario. Once the cost for the sixth arrangement is determined, subsequent orientations of the label can be tested to determine if a lower cost arrangement is possible.

Figure 9:
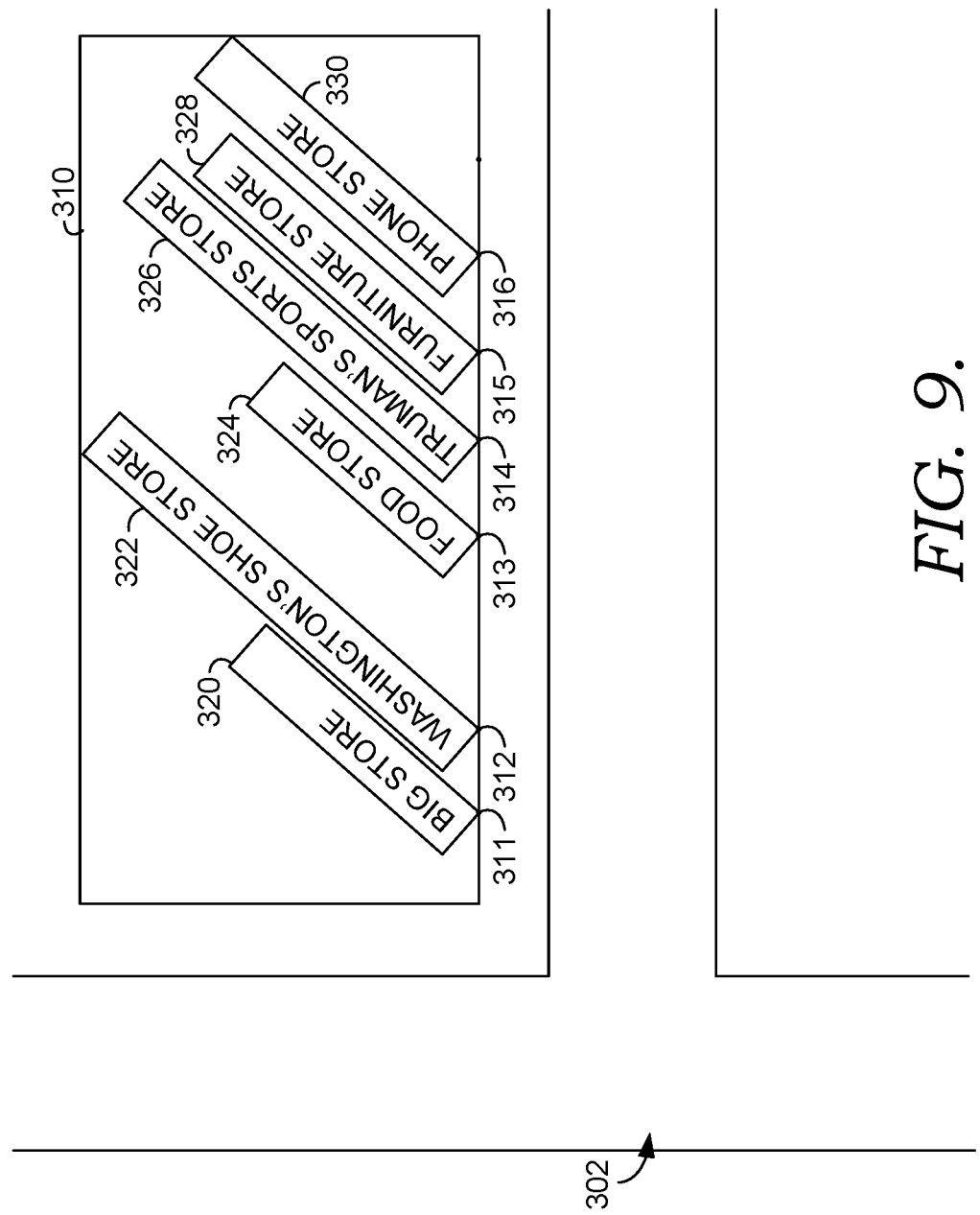
FIG. 9 is a diagram depicting a seventh label placement arrangement, in accordance with an aspect of the technology described herein.

Turning now to FIG. 9, a seventh arrangement 900 excluding a label is shown, according to an aspect of the technology described herein. As can be seen, the coffee shop label 332 has been excluded from the seventh arrangement 900. The initial arrangement can be determined using costs calculated with previous arrangements. In this case, the coffee shop label 332 could have been eliminated because it was observed that it was the only label protruding from one or more arrangements. The initial arrangement of the other labels could be based on selecting an arrangement where only the coffee shop label 332 has a protrusion zone.

As can be seen, the seventh arrangement 900 includes no protrusion zones. However, in some aspects the cost may not be zero. As previously mentioned, a visibility penalty can be added when less than all available business labels are included. The visibility penalty can be the number of hidden labels times the visibility factor. In this case, the number of hidden labels is one. Accordingly, the visibility factor or cost is 1 times whatever the visibility factor is. If the visibility factor is greater than the cost calculated with reference to the second arrangement 400 then the seventh arrangement (or any other previously calculated arrangement with a lower cost) may have a higher cost than the second arrangement. Alternatively, if the visibility factor was lower than the cost for the second arrangement then the seventh arrangement 900 would have a lower cost and become the presumptive display.

As mentioned, aspects of the technology are not limited to hiding a label that is protruding. In one aspect, the hidden labels are intelligently determined based on context and likely user interests in the various stores associated with the labels given the context. For example, a business that is not open at the time the final map is to be shown may be excluded.

Figure 10:
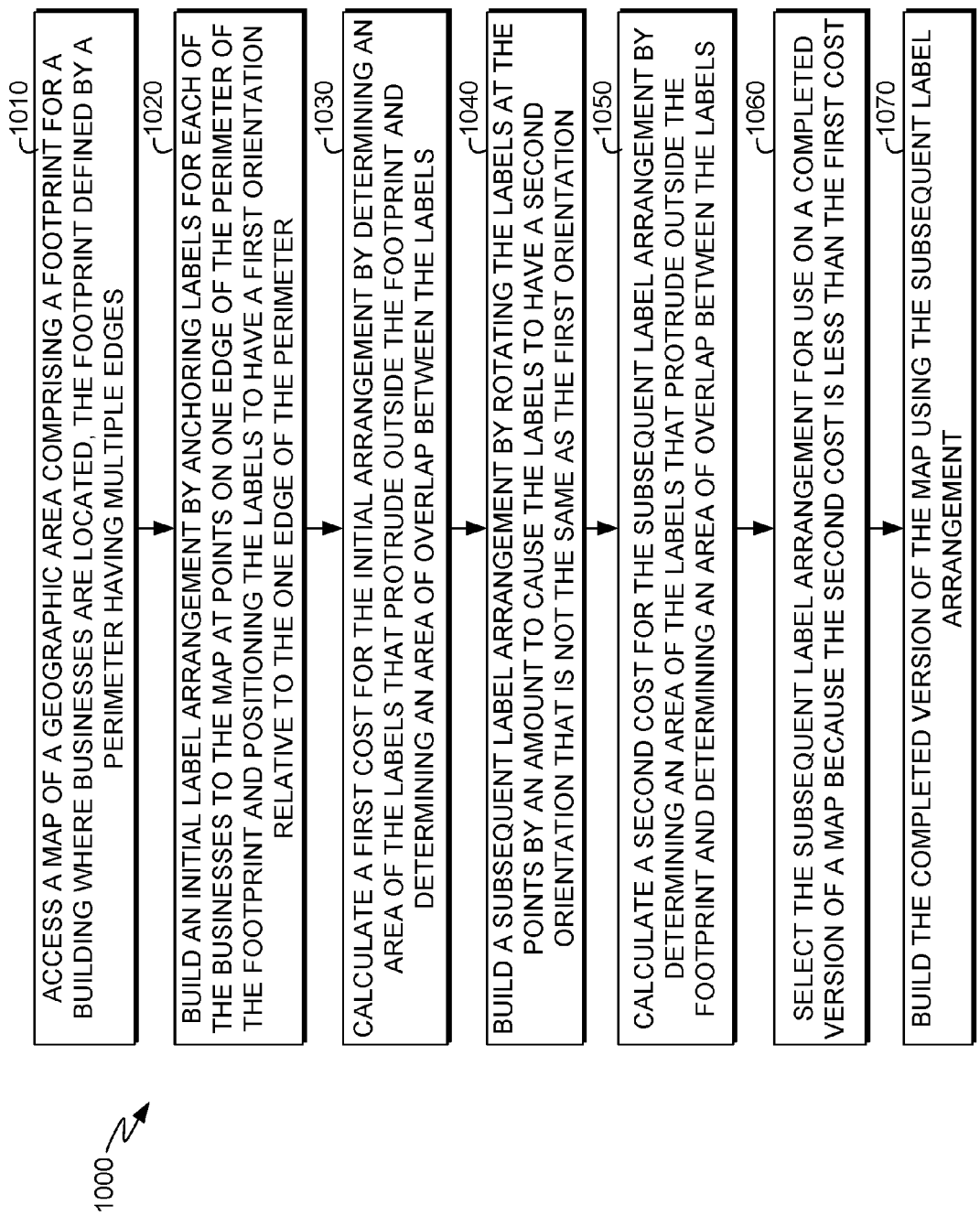
FIG. 10 is a diagram depicting a method of adding business labels to a map, in accordance with an aspect of the technology described herein.

Turning now to FIG. 10, a flowchart showing a method 1000 of arranging business labels on an electronic map is provided. The method 1000 could be performed by a map provider and stored to be recalled when a digital map is accessed by a user device. The method 1000 could be repeated to develop a series of map portions for a given area. For example, the same portion of a map showing a building could be built at different zoom levels and for different contexts. A map portion could be built for different times of day or other contexts such as user interests. A map portion could be built for users that like coffee, another for users that like BBQ, another for uses interested in sports, and such. The different contexts can be used to select labels for exclusion or inclusion when an optimal arrangement with all labels is not available.

At step 1010, a map of a geographic area comprising a footprint for a building where businesses are located is accessed. The footprint is defined by a perimeter having multiple edges. As mentioned, the technology described herein can add labels for businesses to a map. Accordingly, a starting point for this process can be existing maps or map portions that labels are to be added to. The business labels may be added as a layer of a map or an overlay on an existing map. Once the labels are added, a viewer may not be able to discern that the labels are part of a separate layer. In another aspect, the business labels are embedded into a map image to form a single new image. The footprint can also be a separate layer or entity that is distinct from the underlying map. In one aspect, the perimeter or edges of the building footprint are accessible or otherwise extracted into a geometric shape that can be analyzed in comparison with the labels in isolation from the map. In other words, a shape based on the footprint of the building shown a map can be generated to determine whether the labels fit inside the perimeter of the footprint. The shape can then be discarded when the analysis is complete, while the actual footprint remains on the map.

The maps can include footprints for one or more buildings, in which case, the method 1000 could be repeated for each building to which labels are to be added. The footprint can be derived from aerial photography or some other source. The footprint is comprised of lines that conform to the exterior perimeter of the buildings. The footprints can form regular or irregular shapes. The footprint can exclude small protrusions from a building. Accordingly, the footprint for a building is approximately the same shape as the actual building and sized according to the scale of the map to match the size of the actual building.

At step 1020, an initial label arrangement is built by anchoring labels for each of the businesses to the map at points on one edge of the perimeter of the footprint and positioning the labels to have a first orientation relative to the one edge of the perimeter. In an aspect, each label is snapped to an edge of the footprint associated with one or more business-entrance anchors. Each label could be perpendicular to the edge in the initial arrangement. Aspects of the technology are not limited to starting with a preliminary arrangement showing the labels perpendicular to a edge of the building footprint. In one aspect, the initial orientation of the labels is randomly generated for the preliminary arrangement. Each label could have the same font which can be at an established minimum for a given zoom level. In general, the labels can be generated in conformance with guidelines that specify how labels should appear. In one aspect, the initial arrangement is generated according to a first scenario.

At step 1030, a first cost for the initial arrangement is calculated by determining an area of the labels that protrude outside the perimeter of the footprint and determining an area of overlap between the labels. The following formula can be used to calculate cost: total cost=overlap area of labels+total area of labels that are outside the building footprint+(number of hidden labels*VISIBILITY_FACTOR). The area outside a perimeter of the building footprint can be described as a protrusion area herein. As mentioned, when an arrangement showing all labels and having zero cost cannot be found, then one or more labels could be removed. These arrangements can be scored with a visibility penalty, which is the number of hidden labels multiplied by the visibility factor. The visibility factor can be set editorially at a value where the developer would prefer the labels to either overlap or fall outside the footprint instead of excluding a label. In other words, the visibility factor could be equal to the combined overlap of labels and the label area outside the footprint that is worth not showing a label. If any label overlap or protrusion beyond the footprint is unacceptable, then the visibility factor would be zero or a small number to eliminate or minimize a visibility penalty for not showing labels. The cost could be expressed in pixels or some other unit of measure for screen area or a measure related in some fashion to the screen area.

In addition to the above cost formula, an additional formula could be: total cost=overlap area of labels+total area of labels that are outside the building footprint+(number of hidden labels*VISIBILITY_FACTOR)+(number of labels not anchored to a business-entrance anchor*non-anchored Factor). This anchor penalty (number of labels not anchored to a business-entrance anchor*non-anchored Factor) can be used to give preferential treatment to arrangements that anchor the labels to the business entrance. Other scenario based penalties could be added to the cost calculation.

At step 1040, a subsequent label arrangement is built by rotating the labels at the points by an amount to cause the labels to have a second orientation that is not the same as the first orientation. Each subsequent arrangement is generated by rotating the labels a different amount. In an aspect, the rotation amount is selected randomly. The rotation amount can be constrained to variations of 1°, 2°, 5°, 10°, 12.5°, and such. In another aspect, the rotation can be systematic. For example, each arrangement could be generated by rotating the labels an additional 12.5° in a clockwise direction.

At step 1050, a second cost for the subsequent label arrangement is calculated by determining an area of the labels that protrude outside the perimeter of the footprint and determining an area of overlap between the labels. The second cost can be calculated using the same scheme used to calculate the first cost.

At step 1060, the subsequent label arrangement is selected for use on a completed version of a map because the second cost is less than the first cost. In addition, the second cost may also meet a selection threshold. In one aspect, label arrangements are generated under a first label arrangement scenario until an arrangement meeting the selection threshold is met. Once all possible arrangements generated for the first scenario are exhausted, arrangements can be generated under a second, less preferable, scenario.

At step 1070, the completed version of the map is built using the subsequent label arrangement. The map can be stored for subsequent display on a user device requesting a map of the geographic area covered by the map. As mentioned, different versions of the map could be generated based on zoom level and context.

Figure 11:
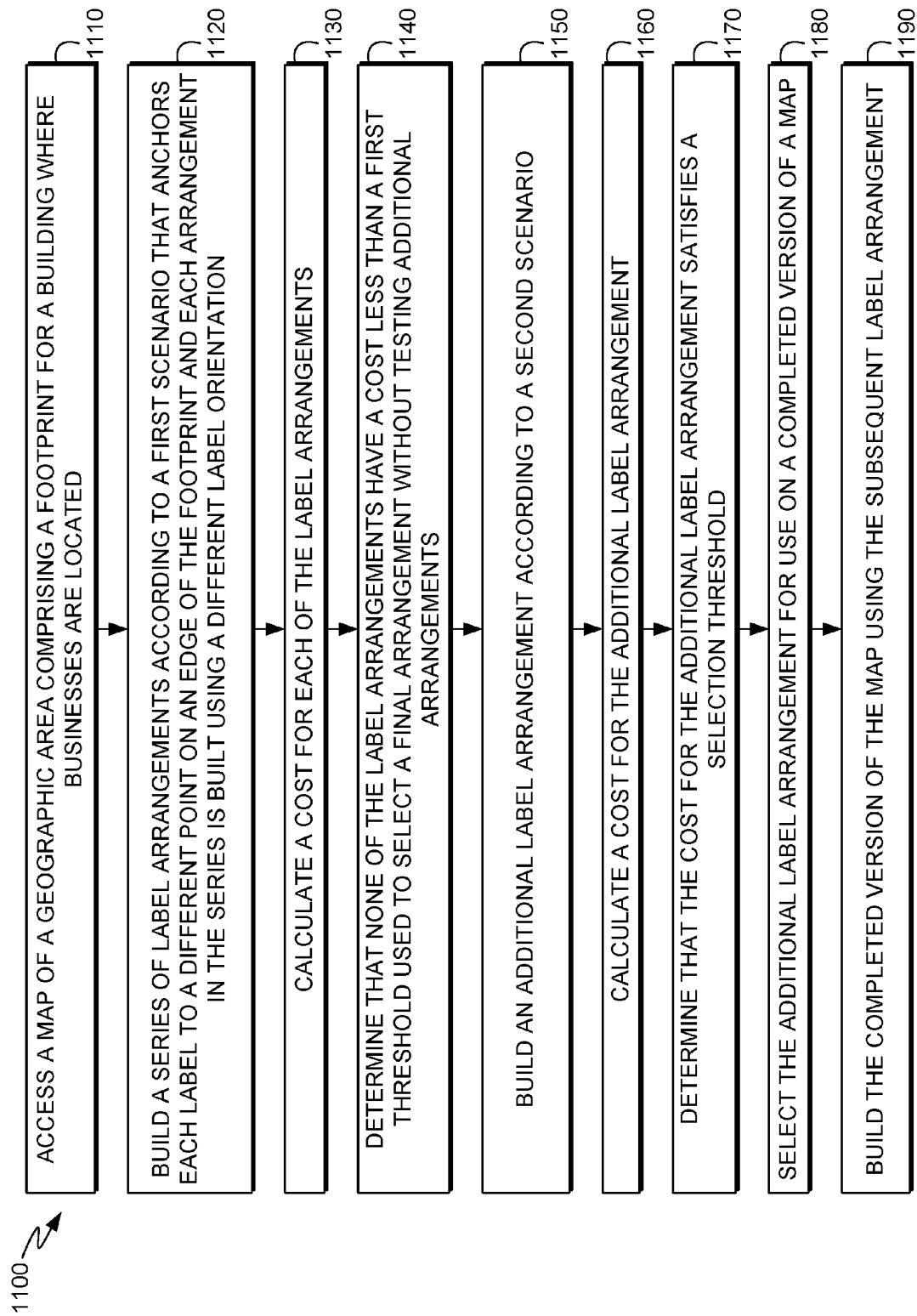
FIG. 11 is a diagram depicting a method of adding business labels to a map, in accordance with an aspect of the technology described herein.

Turning now to FIG. 11, a flow chart showing a method 1100 for arranging business labels on a map is provided. The method 1100 could be performed by a map provider and stored to be recalled when a digital map is accessed by a user device. The method 1100 could be repeated to develop a series of map portions for a given area. For example, the same portion of a map showing a building could be built at different zoom levels and for different contexts.

At step 1110, a map of a geographic area is accessed comprising a footprint for a building where businesses are located, with the footprint defined by a perimeter. As mentioned, the technology described herein can add labels for businesses to a map. Accordingly, a starting point for this process can be existing maps or map portions that labels are to be added to. The business labels may be added as a layer of a map or an overlay on an existing map. Once the labels are added, a viewer may not be able to discern that the labels are part of a separate layer. In another aspect, the business labels are embedded into a map image to form a single new image. The footprint can also be a separate layer or entity that is distinct from the underlying map. In one aspect, the perimeter or edges of the building footprint are accessible or otherwise extracted into a geometric shape that can be analyzed in comparison with the labels in isolation from the map. In other words, a shape based on the footprint of the building shown on a map can be generated to determine whether the labels fit inside the perimeter of the footprint. The shape can then be discarded when the analysis is complete, while the actual footprint remains on the map.

The maps can include footprints for one or more buildings, in which case, the method 1000 could be repeated for each building to which labels are to be added. The footprint can be derived from aerial photography or some other source. The footprint is comprised of lines that conform to the exterior perimeter of the buildings. The footprints can form regular or irregular shapes. The footprint can exclude small protrusions from a building. Accordingly, the footprint for a building is approximately the same shape as the actual building and sized according to the scale of the map to match the size of the actual building.

At step 1120, a series of label arrangements is built according to a first scenario that anchors each label to a different point on an edge of the footprint and each arrangement in the series is built using a different label orientation. In an aspect, each label is snapped to an edge of the footprint associated with one or more business-entrance anchors. Each label could be perpendicular to the edge in the initial arrangement. Aspects of the technology are not limited to starting with a preliminary arrangement showing the labels perpendicular to a edge of the building footprint. In one aspect, the initial orientation of the labels is randomly generated for the preliminary arrangement. Each label could have the same font which can be at an established minimum for a given zoom level. In general, the labels can be generated in conformance with guidelines that specify how labels should appear. In one aspect, the initial arrangement is generated according to a first scenario.

At step 1130, a cost for each of the label arrangements in the series is calculated. The following formula can be used to calculate cost: total cost=overlap area of labels+total area of labels that are outside the building footprint+(number of hidden labels*VISIBILITY_FACTOR). As mentioned, when an arrangement showing all labels and having zero cost cannot be found, then one or more labels could be removed. These arrangements can be scored with a visibility penalty, which is the number of hidden labels multiplied by the visibility factor. The visibility factor can be set editorially at a value where the developer would prefer the labels to either overlap or fall outside the footprint instead of excluding a label. In other words, the visibility factor could be equal to the combined overlap of labels and the label area outside the footprint that is worth not showing a label. If any label overlap or protrusion beyond the footprint is unacceptable, then the visibility factor would be zero or a small number to eliminate or minimize a visibility penalty for not showing labels. The cost could be expressed in pixels or some other unit of measure for screen area or a measure related in some fashion to the screen area.

In addition to the above cost formula, an additional formula could be: total cost=overlap area of labels+total area of labels that are outside the building footprint+(number of hidden labels*VISIBILITY_FACTOR)+(number of labels not anchored to a business-entrance anchor*non-anchored Factor). This anchor penalty (number of labels not anchored to a business-entrance anchor*non-anchored Factor) can be used to give preferential treatment to arrangements that anchor the labels to the business entrance. Other scenario based penalties could be added to the cost calculation.

At step 1140, a determination is made that none of the label arrangements have a cost less than a first threshold used to select a final arrangement without testing additional arrangements. The determination is made by comparing the costs to the threshold.

At step 1150, an additional label arrangement is built according to a second scenario. In one scenario, the anchor points are equally distributed along the edge of the business footprint rather than being tied to the business entrance anchor as in a first scenario. Using this arrangement, the previously described process is repeated with different arrangements being generated and analyzed to determine an arrangement with either zero cost or the lowest cost. If the lowest cost arrangement (possibly taking a scenario-based penalty into consideration for the cost calculation) built according to the second scenarios lower than the cost associated with the lowest cost arrangement built with the labels anchored to the entrance, then the evenly spaced arrangement could replace the business-entrance arrangement within the system.

In another scenario, if the evenly spaced arrangement does not produce an arrangement with zero cost, then one or more of the labels can be removed and the process repeated to determine if an arrangement with zero cost can be identified. Different methods can be used to determine the label that is excluded. In one aspect, a label that contributes the highest cost to one or more different arrangements is removed. In another aspect, a label that contributes the most cost across all arrangements previously calculated is removed. In another aspect, contextual factors are used to determine which label to remove. Contextual factors can include business popularity. For example, more users are likely to want the location of a restaurant or coffee shop on a map than a law office. The cost calculation for this scenario can include a visibility penalty.

At step 1160, a cost for the additional label arrangement is calculated. The cost for the additional label arrangement can be calculated using the same scheme used to calculate the cost for each of the label arrangements in the series. The cost for the additional arrangement may include a scenario-based penalty.

At step 1170, a determination is made that the cost for the additional label arrangement satisfies a selection threshold. The selection threshold can be specific to the second scenario. Different scenarios can have different selection thresholds. For example, the first scenario could include a label for every business in the building and locate each label on a business-entrance anchor. The second scenario could exclude one or more labels. The selection threshold for the first scenario could be zero. The cost for the second scenario could be equal to the visibility penalty. In one aspect, the arrangements under the second scenario are only built and evaluated because none of the arrangements built according to the first scenario had a zero cost or other selection threshold associated with the first scenario. In another aspect, the selection threshold is the same for each arrangement.

At step 1180, the additional label arrangement is selected for use on a completed version of a map. The additional arrangement is selected because the cost for the additional arrangement was determined to be less than the selection threshold in step 1170. In one aspect, the first arrangement that meets the selection threshold can be selected.

At step 1190, the completed version of the map is built using the additional label arrangement. The map can be stored for subsequent display on a user device requesting a map of the geographic area covered by the map. As mentioned, different versions of the map could be generated based on zoom level and context.

Figure 12:
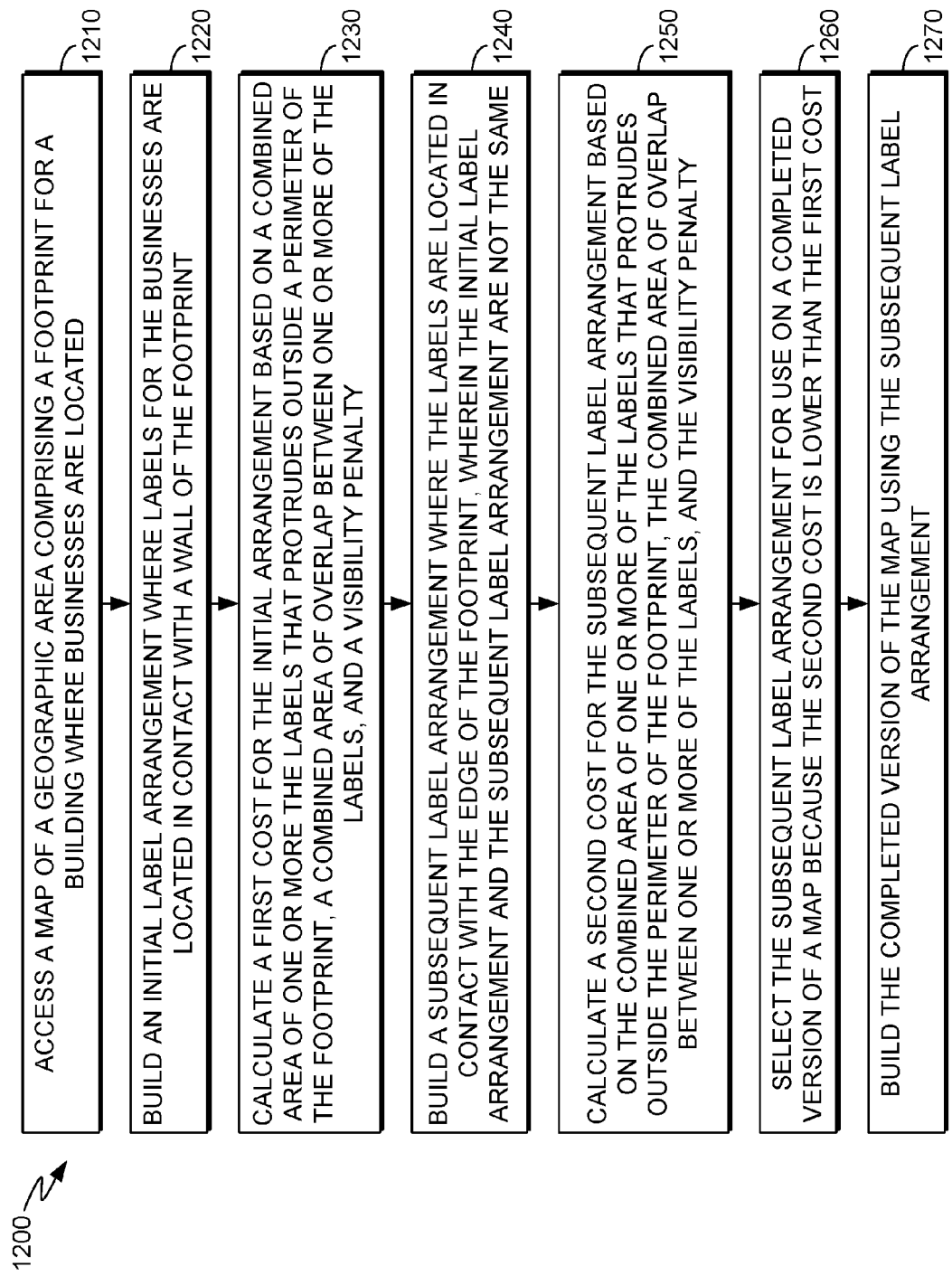
FIG. 12 is a diagram depicting a method of adding business labels to a map, in accordance with an aspect of the technology described herein.

Turning now to FIG. 12, a flow chart showing a method 1200 for arranging business labels on a map is provided. The method 1200 could be performed by a map provider and stored to be recalled when a digital map is accessed by a user device. The method 1200 could be repeated to develop a series of map portions for a given area. For example, the same portion of a map showing a building could be built at different zoom levels and for different contexts.

At step 1210, a map of a geographic area is accessed comprising a footprint for a building where businesses are located. As mentioned, the technology described herein can add labels for businesses to a map. Accordingly, a starting point for this process can be existing maps or map portions that labels are to be added to. The business labels may be added as a layer of a map or an overlay on an existing map. Once the labels are added, a viewer may not be able to discern that the labels are part of a separate layer. In another aspect, the business labels are embedded into a map image to form a single new image. The footprint can also be a separate layer or entity that is distinct from the underlying map. In one aspect, the perimeter or edges of the building footprint are accessible or otherwise extracted into a geometric shape that can be analyzed in comparison with the labels in isolation from the map. In other words, a shape based on the footprint of the building shown a map can be generated to determine whether the labels fit inside the perimeter of the footprint. The shape can then be discarded when the analysis is complete, while the actual footprint remains on the map.

The maps can include footprints for one or more buildings, in which case, the method 1000 could be repeated for each building to which labels are to be added. The footprint can be derived from aerial photography or some other source. The footprint is comprised of lines that conform to the exterior perimeter of the buildings. The footprints can form regular or irregular shapes. The footprint can exclude small protrusions from a building. Accordingly, the footprint for a building is approximately the same shape as the actual building and sized according to the scale of the map to match the size of the actual building.

At step 1220, an initial label arrangement is built where labels for the businesses are located in contact with an edge of the footprint. In an aspect, each label is snapped to an edge of the footprint associated with one or more business-entrance anchors. Each label could be perpendicular to the edge in the initial arrangement. Aspects of the technology are not limited to starting with a preliminary arrangement showing the labels perpendicular to a edge of the building footprint. In one aspect, the initial orientation of the labels is randomly generated for the preliminary arrangement. Each label could have the same font which can be at an established minimum for a given zoom level. In general, the labels can be generated in conformance with guidelines that specify how labels should appear. In one aspect, the initial arrangement is generated according to a first scenario.

At step 1230, a first cost for the initial arrangement is calculated based on a combined area of one or more of the labels that protrude outside a perimeter of the footprint, a combined area of overlap between two of the labels, and a visibility penalty. The following formula can be used to calculate cost: total cost=overlap area of labels+total area of labels that are outside the building footprint+(number of hidden labels*VISIBILITY_FACTOR). As mentioned, when an arrangement showing all labels and having zero cost cannot be found, then one or more labels could be removed. These arrangements can be scored with a visibility penalty, which is the number of hidden labels multiplied by the visibility factor. The visibility factor can be set editorially at a value where the developer would prefer the labels to either overlap or fall outside the footprint instead of excluding a label. In other words, the visibility factor could be equal to the combined overlap of labels and the label area outside the footprint that is worth not showing a label. If any label overlap or protrusion beyond the footprint is unacceptable, then the visibility factor would be zero or a small number to eliminate or minimize a visibility penalty for not showing labels. The cost could be expressed in pixels or some other unit of measure for screen area or a measure related in some fashion to the screen area.

In addition to the above cost formula, an additional formula could be: total cost=overlap area of labels+total area of labels that are outside the building footprint+(number of hidden labels*VISIBILITY_FACTOR)+(number of labels not anchored to a business-entrance anchor*non-anchored Factor). This anchor penalty (number of labels not anchored to a business-entrance anchor*non-anchored Factor) can be used to give preferential treatment to arrangements that anchor the labels to the business entrance. Other scenario based penalties could be added to the cost calculation.

At step 1240, a subsequent label arrangement is built where the labels are located in contact with the edge of the footprint, wherein the initial label arrangement and the subsequent label arrangement are not the same.

At step 1250, a second cost is calculated for the subsequent label arrangement based on the combined area of one or more of the labels that protrudes outside the perimeter of the footprint, the combined area of overlap between two of the labels, and the hidden label penalty. The second cost can be calculated using the same scheme used to calculate the first cost.

At step 1260, the subsequent label arrangement is selected for use on a completed version of a map because the second cost is lower than the first cost. The second cost could also meet a selection threshold. In one aspect, a selection threshold is not used (or not applicable if no arrangements satisfy the threshold) and the arrangement with the lowest score is selected.

At step 1270, the completed version of the map is built using the subsequent label arrangement. The map can be stored for subsequent display on a user device requesting a map of the geographic area covered by the map. As mentioned, different versions of the map could be generated based on zoom level and context.

Figure 13:
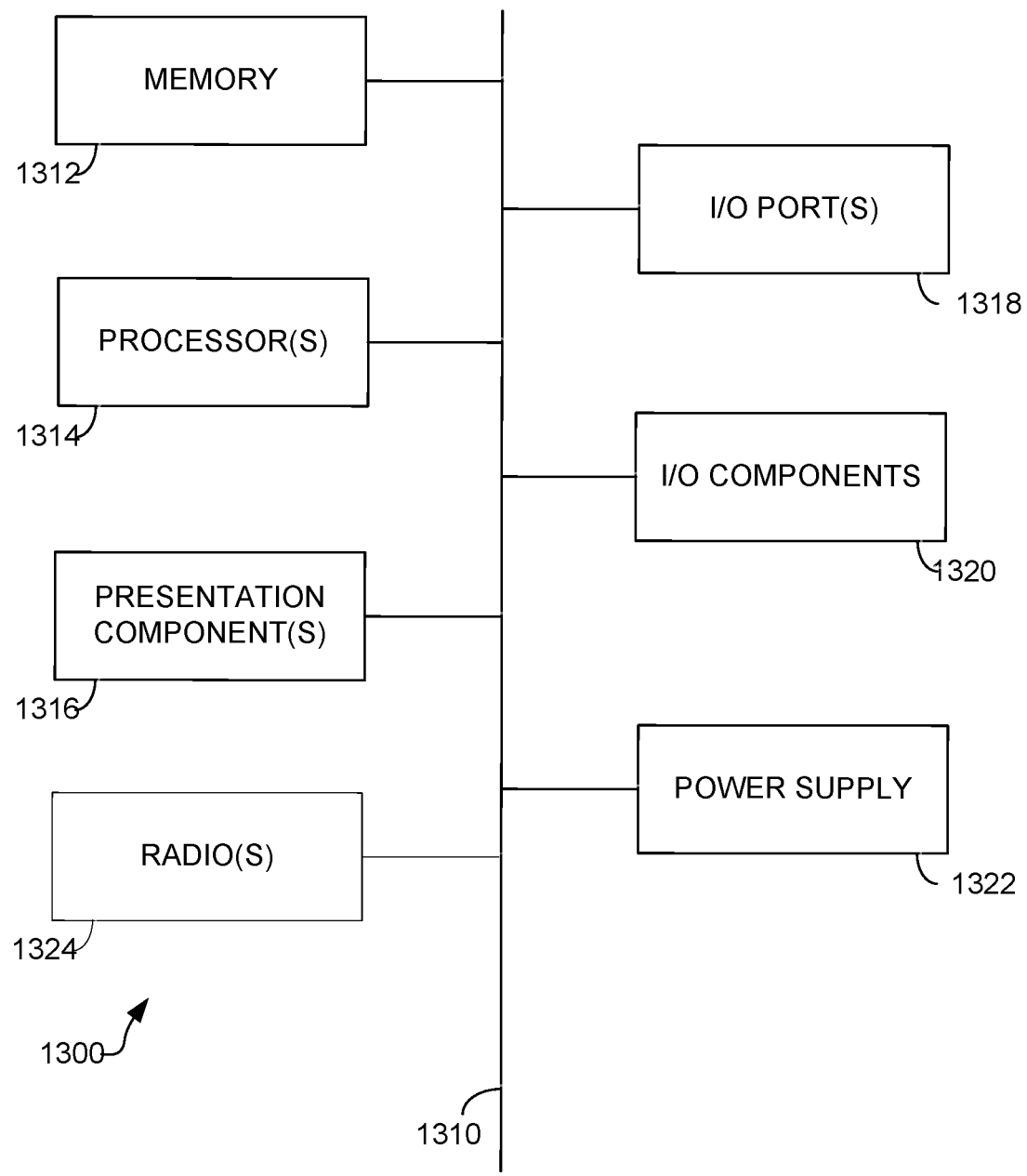
FIG. 13 is a block diagram of an exemplary computing environment suitable for implementing aspects of the technology described herein.

Referring to the FIG. 13 in particular, an exemplary operating environment for implementing aspects of the technology described herein is shown and designated generally as computing device 1300. Computing device 1300 is but one example of a suitable computing environment and is not intended to suggest any limitation as to the scope of use of the technology described herein. Neither should the computing device 1300 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 13, computing device 1300 includes a bus 1310 that directly or indirectly couples the following devices: memory 1312, one or more processors 1314, one or more presentation components 1316, input/output (I/O) ports 1318, I/O components 1320, an illustrative power supply 1322, and radio 1324. Bus 1310 represents what may be one or more busses (such as an address bus, data bus, or a combination thereof). Although the various blocks of FIG. 13 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors hereof recognize that such is the nature of the art and reiterate that the diagram of FIG. 13 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 13 and refer to "computer" or "computing device." The computing device 1300 may be a PC, a tablet, a smartphone, virtual reality headwear, augmented reality headwear, a game console, and such.

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1312 includes computer storage media in the form of volatile and/or nonvolatile memory. The memory 1312 may be removable, non-removable, or a combination thereof. Exemplary memory includes solid-state memory, hard drives, optical-disc drives, etc. Computing device 1300 includes one or more processors 1314 that read data from various entities such as bus 1310, memory 1312, or I/O components 1320. Presentation component(s) 1316 presents data indications to a user or other device. Exemplary presentation components 1316 include a display device, speaker, printing component, vibrating component, etc. I/O ports 1318 allow computing device 1300 to be logically coupled to other devices, including I/O components 1320, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1314 may be direct or via a coupling utilizing a serial port, parallel port, and/or other interface and/or system bus known in the art. Furthermore, the digitizer input component may be a component separate from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 1300. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 1300. The computing device 1300 may be equipped with depth cameras, such as stereoscopic camera systems, infrared camera systems, RGB camera systems, and combinations of these, for gesture detection and recognition. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

The computing device 1300 may include a radio 1324. The radio transmits and receives radio communications. The computing device 1300 may be a wireless terminal adapted to receive communications and media over various wireless networks. The computing device 1300 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth® connection to another computing device is a second example of a short-range connection. A long-range connection may include a connection using one or more of CDMA, GPRS, GSM, TDMA, and 802.16 protocols.

EMBODIMENTS SECTION

Aspects of the technology have been described to be illustrative rather than restrictive. It will be understood that certain features and subcombinations are of utility and may be employed without reference to other features and subcombinations. This is contemplated by and is within the scope of the claims.

The invention claimed is:

1. A computing system comprising:
at least one processor; and
memory having computer-executable instructions stored thereon that, when executed by the at least one processor, configures the system to:
access a map of a geographic area comprising a footprint for a building where businesses are located, the footprint defined by a perimeter having multiple edges;
build an initial label arrangement by anchoring labels for each of the businesses to the map at points on one edge of the perimeter of the footprint and positioning the labels to have a first orientation relative to the one edge of the perimeter;
calculate a first cost for the initial arrangement by determining a size of a combined area of the labels that protrudes outside the perimeter of the footprint, determining a size of a combined area of overlap between the labels, and a visibility penalty for the initial label arrangement;
build a subsequent label arrangement by rotating the labels at the points by an amount to cause the labels to have a second orientation that is not the same as the first orientation;
calculate a second cost for the subsequent label arrangement by determining a size of a combined area of the labels that protrudes outside the perimeter of the footprint, determining a size of a combined area of overlap between the labels, and a visibility penalty for the subsequent label arrangement;
select the subsequent label arrangement for use on a completed version of a map because the second cost is less than the first cost; and
build the completed version of the map using the subsequent label arrangement.

2. The computing system of claim 1, wherein the points are business-entrance anchors.

3. The computing system of claim 1, wherein the points are evenly spaced across the one edge.

4. The computing system of claim 1, wherein the amount is a random amount.

5. The computing system of claim 1, wherein the system is further configured to display the completed version of the map to a user.

6. The computing system of claim 1, wherein the second cost is less than a selection threshold.

7. A method for arranging business labels on a map, the method comprising:
accessing a map of a geographic area comprising a footprint for a building where businesses are located, the footprint defined by a perimeter having multiple edges;
building series of label arrangements according to a first scenario that anchors each label for each of the businesses to a different point on an edge of the perimeter of the footprint and each arrangement in the series is built using a different label orientation by rotating each label at the different point by an amount to cause the label to have a different orientation;

calculating a cost for each of the label arrangements in the series, wherein the cost for an individual label arrangement is based on a size of a combined area of one or more of the labels that protrudes outside a perimeter of the footprint in the individual label arrangement, a size of a combined area of overlap between the labels in the individual label arrangement, and a visibility penalty for the individual label arrangement;

determining that none of the label arrangements have a cost less than a first threshold used to select a final arrangement without testing additional arrangements;

building an additional label arrangement according to a second scenario by rotating each labels at the different points by an amount to cause the labels to have an orientation different from those of the label arrangements;

calculating a cost for the additional label arrangement based on a size of a combined area of one or more of the labels that protrudes outside a perimeter of the footprint, a size of a combined area of overlap between the labels, and a visibility penalty for the additional arrangement;

determining that the cost for the additional label arrangement satisfies a selection threshold;

selecting the additional label arrangement for use on a completed version of a map; and building the completed version of the map using the additional label arrangement.

8. The method of claim 7, wherein the first threshold is zero cost, wherein the zero cost indicates that all labels are entirely within a perimeter of the footprint and none of the labels overlap each other.

9. The method of claim 7, wherein the second scenario excludes a label for at least one of the businesses.

10. The method of claim 9, wherein said calculating a cost for the additional label arrangement comprises calculating a visibility penalty.

11. The method of claim 7, wherein the first scenario locates the labels at business-entrance anchors.

12. The method of claim 11, wherein said calculating a cost for the additional label arrangement comprises calculating an anchor penalty for not locating the labels at business-entrance anchors.

13. The method of claim 7, wherein each of the different label orientations is generated by rotating the labels a random amount from a previously generated arrangement.

14. One or more computer storage media having computer-executable instructions embodied thereon that, when executed, configure a computing device to perform a method for arranging business labels on a map, the method comprising:

accessing a map of a geographic area comprising a footprint for a building where businesses are located, the footprint defined by a perimeter having multiple edges;

building an initial label arrangement by anchoring labels for each of the businesses to the map at points on one edge of the perimeter of the footprint and positioning the labels to have a first orientation relative to the one edge of the perimeter;

calculating a first cost for the initial arrangement based on a size of a combined area of one or more of the labels that protrudes outside a perimeter of the footprint, a size of a combined area of overlap between the labels, and a visibility penalty for the initial arrangement;

building a subsequent label arrangement by rotating the labels at the points by an amount to cause the labels to have a second orientation that is not the same as the first orientation;

calculating a second cost for the subsequent label arrangement based on a size of a combined area of one or more of the labels that protrudes outside the perimeter of the footprint, a size of a combined area of overlap between the labels, and the visibility penalty for the subsequent label arrangement;

selecting the subsequent label arrangement for use on a completed version of a map because the second cost is lower than the first cost; and building the completed version of the map using the subsequent label arrangement.

15. The media of claim 14, wherein the subsequent label arrangement has one less label than the initial arrangement.

16. The media of claim 15, wherein the method further comprises:

selecting a label associated with a business for exclusion from inclusion in the subsequent label arrangement based on a time of day when the map is designated for display and an hours of operation for the business.

17. The media of claim 14, wherein the subsequent label arrangement spaces the labels evenly and the initial arrangement locates than the labels on business-entrance anchors that correspond to an entrance of a business described on a corresponding label.

18. The media of claim 17, wherein the cost further comprises an anchor penalty.

* * * * *